United States Patent [19]
Breslin

[11] Patent Number: 6,010,144
[45] Date of Patent: *Jan. 4, 2000

[54] RECEIVER HITCH ANTI-RATTLE DEVICE

[75] Inventor: Patrick William Breslin, Wickenburg, Ariz.

[73] Assignee: U-Haul International, Inc., Phoenix, Ariz.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/958,739

[22] Filed: Oct. 27, 1997

Related U.S. Application Data

[63] Continuation of application No. 08/633,586, Apr. 17, 1996, which is a continuation of application No. 08/470,663, Jun. 6, 1995, Pat. No. 5,593,172, which is a division of application No. 08/281,828, Jul. 28, 1994, abandoned.

[51] Int. Cl.$^7$ .................................................. B60D 1/00
[52] U.S. Cl. ...................... 280/506; 280/491.5; 403/104
[58] Field of Search ............................. 280/491.1, 491.5, 280/495, 504, 506, 491.2, 482; 224/521, 519, 518; 403/3, 104, 109, 362, 377, 379

[56] References Cited

U.S. PATENT DOCUMENTS

| | | | |
|---|---|---|---|
| 2,503,738 | 4/1950 | Horton | 287/58 |
| 2,639,160 | 5/1953 | Studebaker | 280/33.44 |
| 2,685,468 | 8/1954 | Blocker | 287/103 |
| 3,818,646 | 6/1974 | Peterson | 51/217 R |
| 3,858,989 | 1/1975 | Field | 403/171 |
| 4,050,714 | 9/1977 | Epp | 280/495 |
| 4,072,257 | 2/1978 | Hall | 224/521 X |
| 4,576,501 | 3/1986 | McConnell | 403/109 X |
| 4,620,718 | 11/1986 | Mickelson | 280/507 |
| 4,711,595 | 12/1987 | Magid et al. | 403/108 |
| 4,989,892 | 2/1991 | Kerins et al. | 280/504 |
| 4,998,841 | 3/1991 | Wilde | 403/104 |
| 5,025,932 | 6/1991 | Jay | 224/521 X |
| 5,169,168 | 12/1992 | Harry et al. | 280/511 |
| 5,184,840 | 2/1993 | Edwards | 280/507 |
| 5,186,483 | 2/1993 | Sheppard | 280/494 |
| 5,333,888 | 8/1994 | Ball | 280/504 |
| 5,449,100 | 9/1995 | Eckhart | 224/521 X |
| 5,593,172 | 1/1997 | Breslin | 280/506 |

FOREIGN PATENT DOCUMENTS

| | | | |
|---|---|---|---|
| 24 58 948 | 6/1976 | Germany . | |
| 74960 | 4/1949 | Norway | 280/504 |
| 2 235 668 | 3/1991 | United Kingdom . | |

*Primary Examiner*—Lanna Mai
*Assistant Examiner*—Avraham H. Lerner
*Attorney, Agent, or Firm*—Jeffer, Mangles, Butler & Marmaro LLP

[57] ABSTRACT

A device for a receiver-type hitch used on vehicles for towing a load, wherein the device acts to prevent movement and resultant rattling between a receiver tube of the hitch and a ball mount shank. In operation, the receiver tube receives the ball mount shank. The device applies a force to the ball mount shank which presses the ball mount shank against the inside of the receiver tube and therein prevents movement.

2 Claims, 4 Drawing Sheets

RECEIVER HITCH ANTI-RATTLE DEVICE

This application is a continuation of application Ser. No. 08/633,586, filed Apr. 17, 1996, which in turn is a continuation of application Ser. No. 08/470,663, filed Jun. 6, 1995, now U.S. Pat. No. 5,593,172, which in turn is a division of application Ser. No. 08/281,828, filed Jul. 28, 1994, abandoned.

BACKGROUND OF THE INVENTION

The present invention relates generally to receiver hitch/ball mount combinations which are attachable to a towing vehicle for operable connection to an object to be towed. More specifically, the invention relates to a device which eliminates movement between the receiver hitch and the ball mount. As the movement between the receiver hitch and the ball mount is eliminated; so too will any noise which is created due to such movement.

Typically, the receiver hitch will comprise a receiver tube and the ball mount will comprise a mount shank. In order for the mount shank to be easily inserted into the receiver tube, the receiver tube will be slightly larger than the mount shank. Due to the slight difference in size the mount shank will have a tendency to move within the receiver tube and therein producer a rattling noise. While the movement and resultant noise may not have a detrimental effect on the mount combination, the rattling noise tends to be an annoyance.

SUMMARY OF THE INVENTION

It is an object of the invention to provide a device that will eliminate the movement between a receiver hitch and a ball mount.

It is a further object of the invention to provide a device that may be easily installed on the receiver hitch/ball mount combination.

According to a first preferred embodiment of the present invention, the device includes a collar arrangement which comprises means for attaching to a receiver tube and means for applying a pressure to a mount shank in order to press the mount shank into engagement with the receiver tube.

According to a second preferred embodiment of the present invention, a receiver tube is provided which comprises means for applying a pressure to a mount shank in order to press the mount shank into engagement with the receiver tube.

DESCRIPTION OF THE PREFERRED EMBODIMENTS

Figure 1:
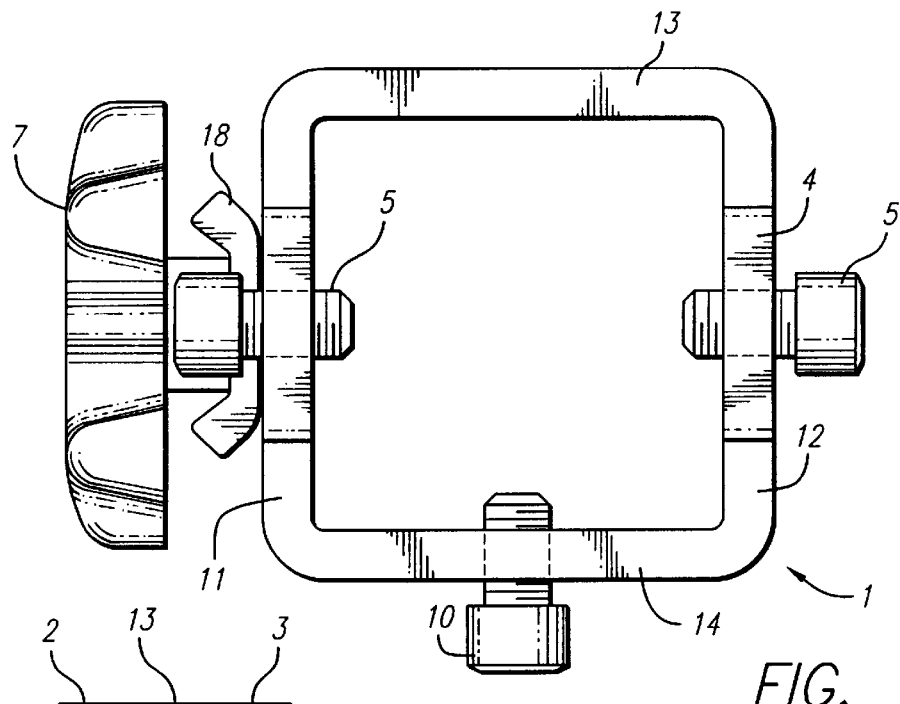
FIG. 1 is a rear elevational view of one embodiment of the present invention.
Figure 2:
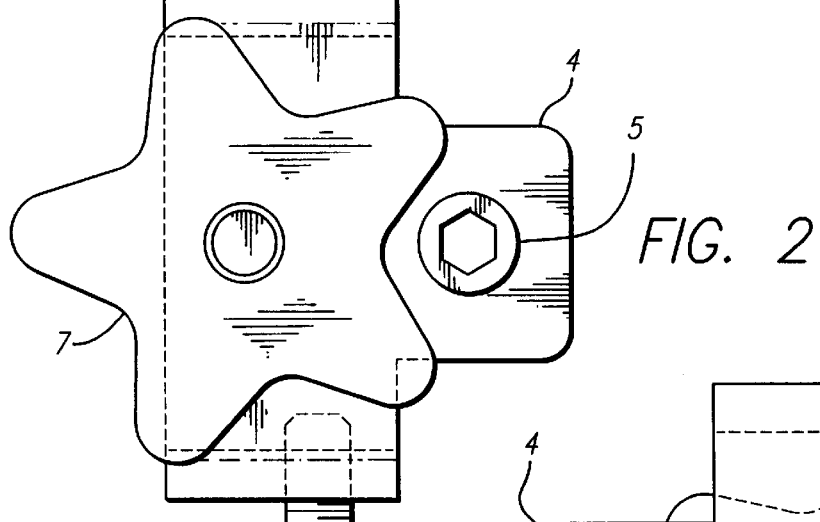
FIG. 2 is a left side elevational view of the embodiment of FIG. 1.
Figure 3:
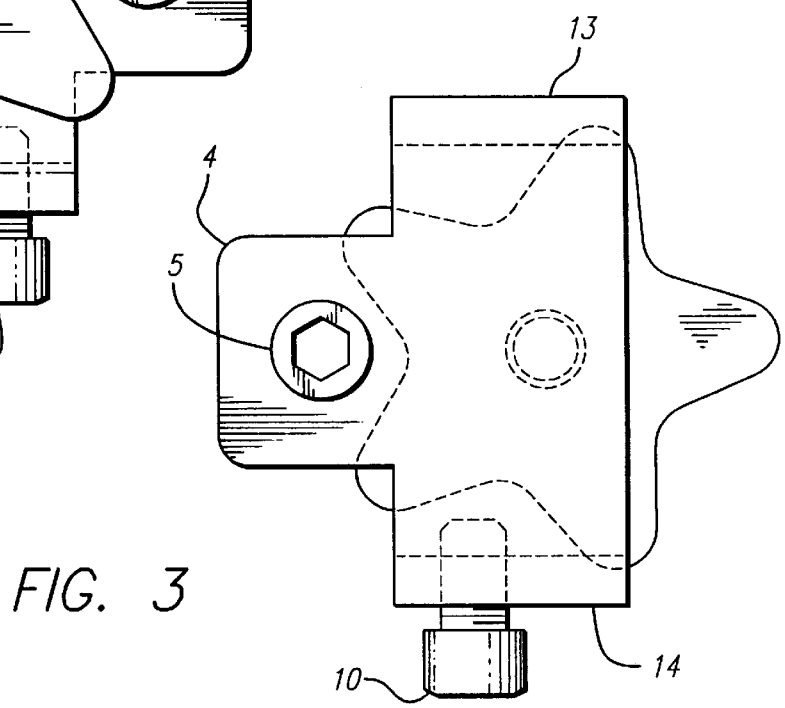
FIG. 3 is a right side elevational view of the embodiment of FIG. 1.
Figure 4:
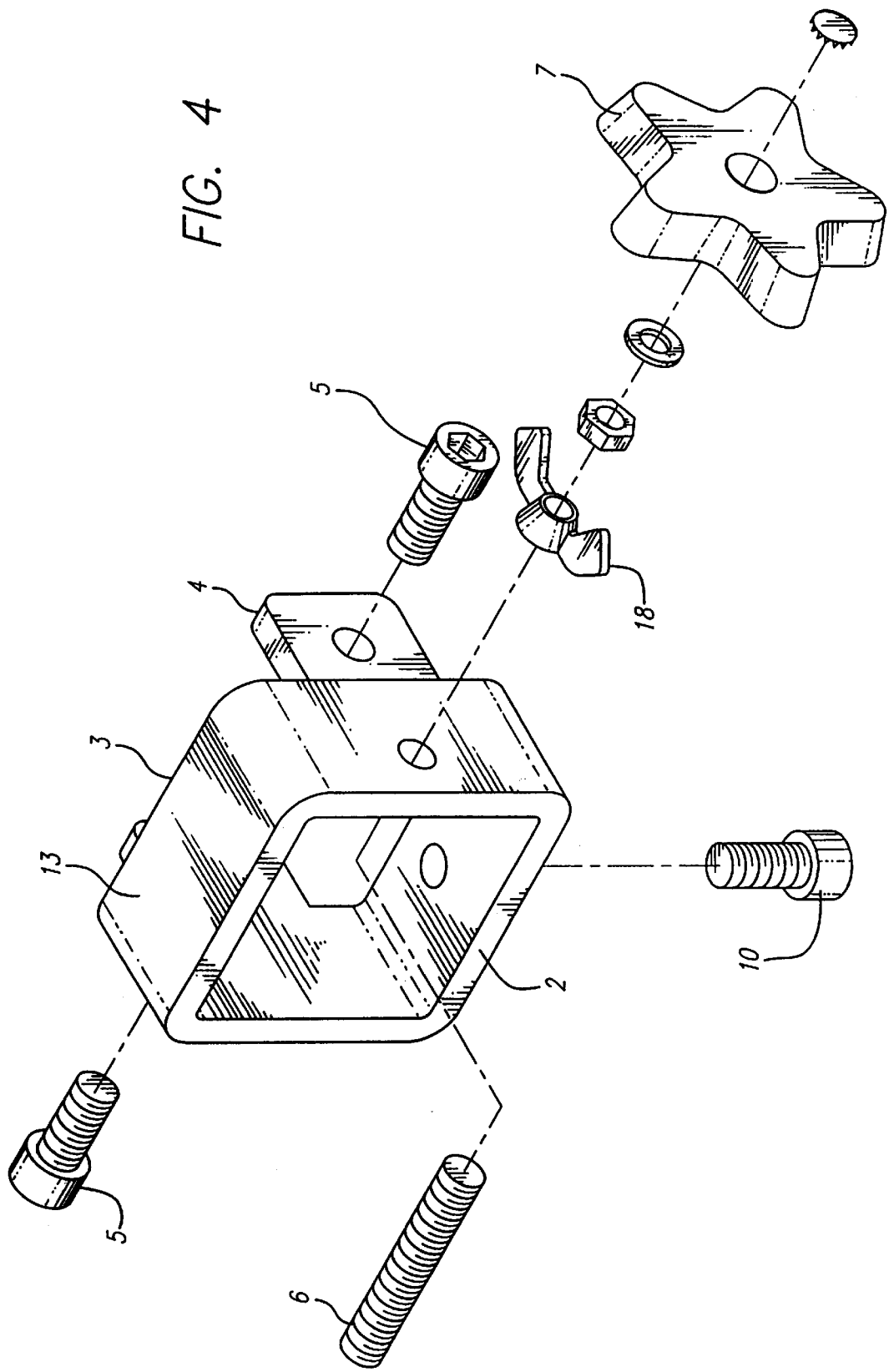
FIG. 4 is a front-left side perspective exploded view of the embodiment of FIG. 1.
Figure 5:
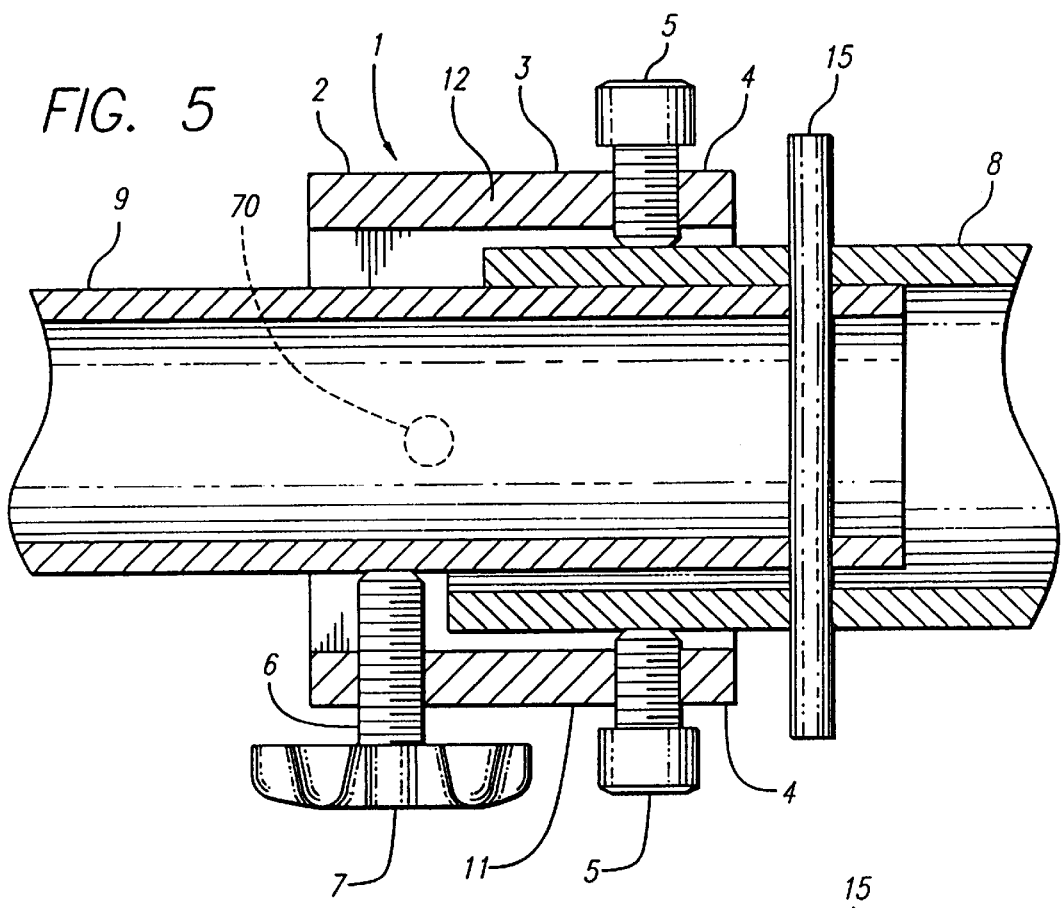
FIG. 5 is a plan sectional view of the embodiment of FIG. 1 engaged with a receiver tube and a mount shank.

The present invention will now be described with reference to FIGS. 1–5. A collar 1 of a preferred embodiment is illustrated in FIGS. 1–4. The collar 1 has a front end 2, a rear end 3, a pair of sidewalls 11 and 12, a top wall 13 and a bottom wall 14. Each sidewall 11 and 12 may have a rearwardly extending extension 4. Each extension 4 is formed with an aperture to receive a screw 5 for mounting the collar 1 to a receiver tube 8. It should be understood that other means equivalent to screw 5, such as a bolt 5A or a pin 5B, may be used to mount the collar 1 to the receiver tube 8. The bottom wall 14 also has an aperture near the rear end 3 for receiving a screw 10 for mounting the collar 1 to the receiver tube 8. Again, it should be noted that other mounting means equivalent to screw 10 may be employed. Sidewall 11 further has an aperture for receiving screw 6. Screw 6 engages a mount shank 9 as illustrated in FIG. 5. Screw 6 further may be operably connected to a knob 7 on an end opposite the end which engages mount shank 9. A wing nut 18 may be employed to aid screw 6 in engaging mount shank 9.

FIG. 5 illustrates a collar of a preferred embodiment of the present invention engaged with receiver tube 8 and mount shank 9. In operation, the rear end 3 of collar 1 is placed around a terminal end of receiver tube 8. Collar 1 is affixed to the terminal end of receiver tube 8 by extension screws 5 and bottom wall screw 10. Once collar 1 is attached to receiver tube 8, mount shank 9 is inserted into receiver tube 8. Mount shank 9 is fixed into a longitudinal position relative to receiver tube 8 by conventional fixing means such as a pin 15 which extends through openings in tube 8 and shank 9. Once the mount shank 9 is fixed by pin 15, screw 6 is engaged by turning knob 7 to apply a pressure against mount shank 9. As pressure is applied by screw 6 against mount shank 9, mount shank 9 is pressed into engagement with receiver tube 8. Once screw 6 is fully tightened so as to engage mount shank 9 with receiver tube 8 all movement between mount shank 9 and receiver tube 8 will be eliminated. This in turn will eliminate any rattling noise due to movement between mount shank 9 and receiver tube 8.

Figure 6:
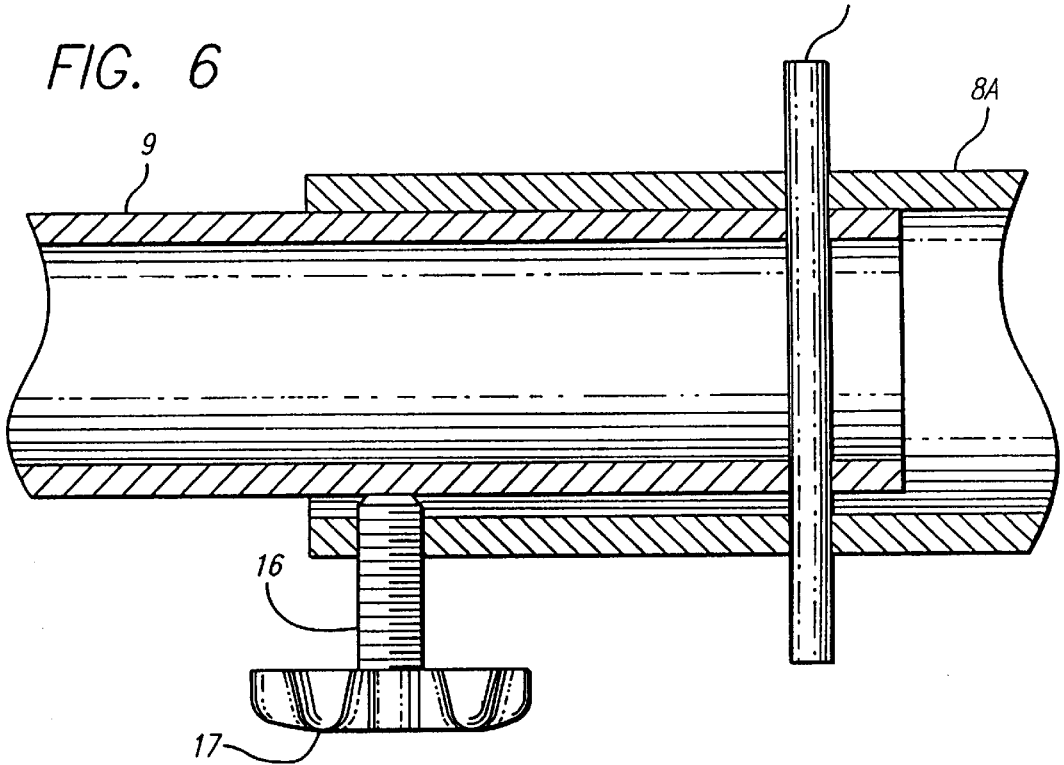
FIG. 6 is a plan sectional view of an alternative embodiment of the present invention.
Figure 7:
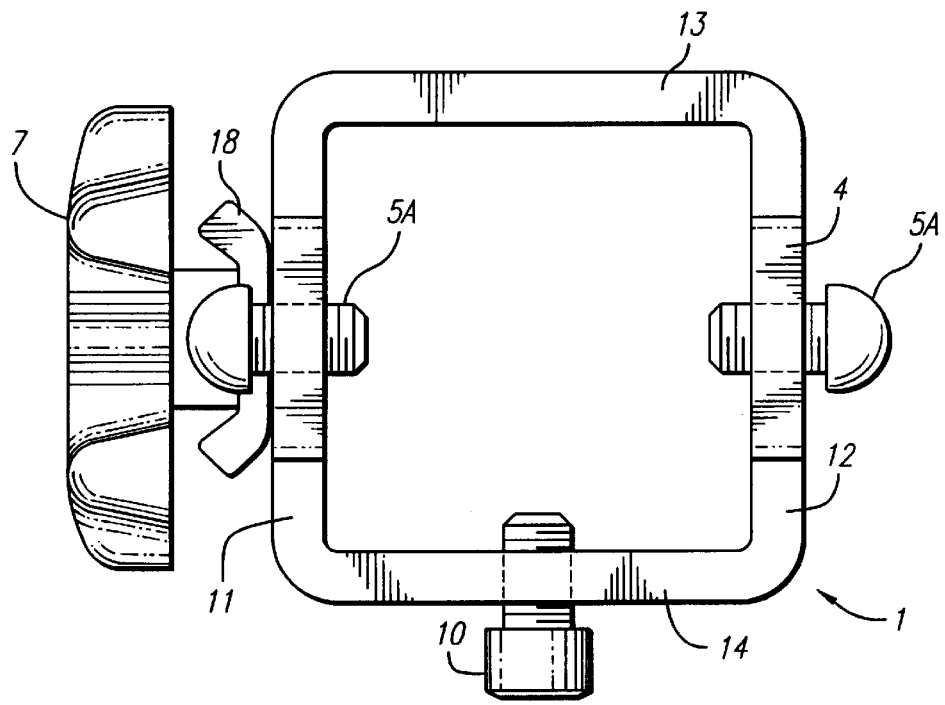
FIG. 7 is a rear elevational view of another embodiment of the invention employing bolts to mount the collar to the receiver tube.
Figure 8:
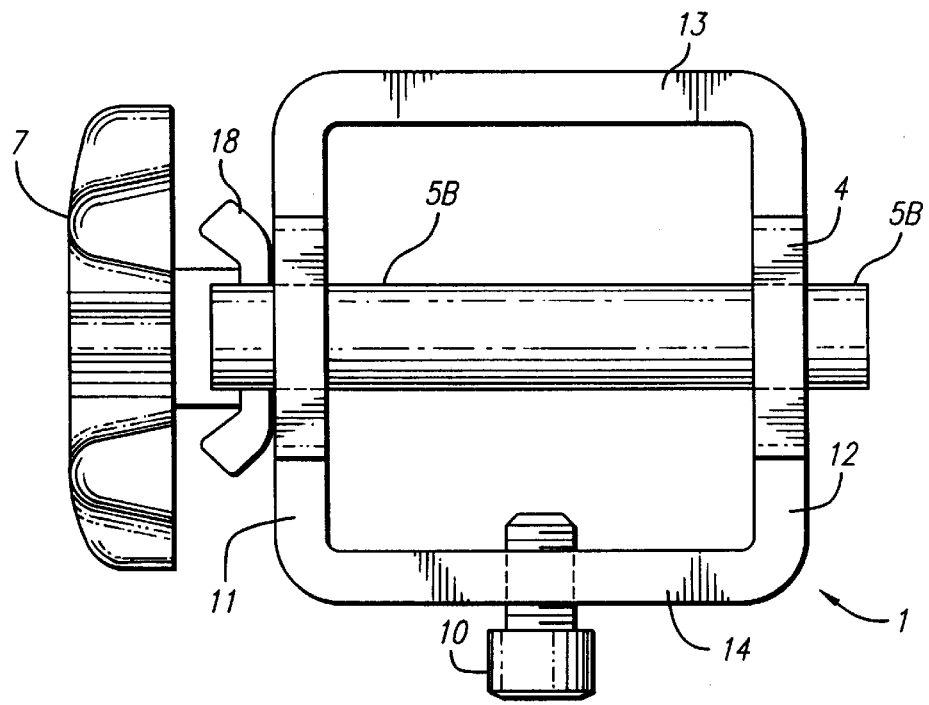
FIG. 8 is a rear elevational view of another embodiment of the invention employing a pin to mount the collar to the receiver tube.

A second preferred embodiment is illustrated in FIG. 6. This embodiment provides a simplified anti-rattling arrangement. As illustrated in FIG. 6, mount shank 9 is inserted into receiver tube 8A. The mount shank 9 is fixed to receiver tube 8 along a longitudinal axis of the receiver tube by pin 15. Receiver tube 8,has a threaded bore for receiving a screw 16. Screw 16 is tightened by a knob 17 fixed to screw 16. As screw 16 is tightened to engage mount shank 9, mount shank 9 is pressed into engagement with receiver tube 8. Once screw 16 is fully tightened and mount shank 9 is pressed against receiver tube 8 all movement between mount shank 9 and receiver tube 8 will be eliminated.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An anti-rattle device for use with a receiver hitch having a receiver tube having an end and a mount shank receivable in said end of said receiver tube, said anti-rattle device comprising:
   (a) an elongated collar having
      (i) opposed side walls, each side wall having a front end and a rear end, and
      (ii) opposed top and bottom walls extending between said side walls, said top and bottom walls having a front end and a rear end,
   wherein each rear end of said opposed side walls has a rearwardly extending extension provided with a retention pin receiving aperture, said bottom wall has a retention pin receiving aperture near said rear end thereof, and one of said side walls has a tightening bolt receiving aperture near said front end thereof;
   (b) three retention members, each operably inserted in a respective one of said receiving apertures for mounting and retaining said collar on an end of said receiver tube of said receiver hitch; and
   (c) a tightening bolt operably inserted in said tightening bolt receiving aperture for applying a force normal to said mount shank of said receiver hitch beyond said end of said receiver tube,
   whereby when said tightening bolt is tightened to fixably press said mount shank against said receiver tube, movement of said mount shank within said receiver tube is prevented.

2. The anti-rattle device of claim 1 wherein said side, top and bottom walls form a single continuous structure.

* * * * *